United States Patent [19]

Igashira et al.

[11] Patent Number: 4,722,310
[45] Date of Patent: Feb. 2, 1988

[54] FUEL INJECTION CONTROL FOR DIESEL ENGINE

[75] Inventors: Toshihiko Igashira, Toyokawa; Taro Tanaka, Nagoya; Yasuyuki Sakakibara, Nishio; Yasuhiro Takeuchi, Okazaki, all of Japan

[73] Assignee: Nippon Soken, Inc., Nishio, Japan

[21] Appl. No.: 847,268

[22] Filed: Apr. 2, 1986

[30] Foreign Application Priority Data

Apr. 2, 1985 [FR] France ............... 60-68520

[51] Int. Cl.$^4$ ............................. F02M 39/00
[52] U.S. Cl. ..................... 123/300; 123/494; 123/501
[58] Field of Search ............ 123/300, 299, 494, 43, 123/429, 419, 501; 73/119 A

[56] References Cited

U.S. PATENT DOCUMENTS

| | | | |
|---|---|---|---|
| 4,217,871 | 8/1980 | Ohashi | 123/299 |
| 4,543,930 | 10/1985 | Baker | 123/300 |
| 4,545,345 | 10/1985 | Pagdin | 123/299 |
| 4,606,312 | 8/1986 | Nakano | 123/435 |
| 4,612,898 | 9/1986 | Steiger | 123/299 |

FOREIGN PATENT DOCUMENTS

| | | | |
|---|---|---|---|
| 59-18249 | 1/1984 | Japan | 123/494 |
| 59-49740 | 4/1984 | Japan | 123/494 |

Primary Examiner—Carl Stuart Miller
Attorney, Agent, or Firm—Cushman, Darby & Cushman

[57] ABSTRACT

In order to perform fuel injection control for a diesel engine, data read by an ignition timing data reading means is compared with a reference data to calculate an ignition timing difference. The ignition timing error is compared with a predetermined threshold value to decide whether or not the ignition timing difference exceeds the predetermined threshold value. A pilot injection timing correction data is generated in accordance with the result of the decision. The pilot injection timing control data is instructed in accordance with the pilot injection timing correction data, and pilot injection timing control is performed in accordance with the pilot injection timing control instruction. A feedback control of a signal based on an output from the ignition timing detector is used for control of a pilot injection timing, so that ignition at a desired ignition timing is performed.

9 Claims, 12 Drawing Figures

FUEL INJECTION CONTROL FOR DIESEL ENGINE

BACKGROUND OF THE INVENTION

1. Field of the Invention

The present invention relates to a method and an apparatus for controlling the fuel injection in a diesel engine. The method and apparatus according to the present invention are applied to a diesel engine utilizing a pilot injection process.

2. Description of the Related Art

In a conventional diesel engine, pilot injection is widely used to eliminate engine noise and reduce fuel consumption. Along with recent developments in fuel injection control, the pilot injection quantity and a non-injection period before main injection have been improved and optimized. The optical pilot injection quantity and the optimal non-injection period have been found to vary according to the Cetane number of a fuel, and to an engine warming-up temperature. More specifically, when the Cetane number and the engine warming-up temperature are lower, the pilot injection quantity must be increased and the injection timing must be advanced. No satisfactory fuel injection control apparatus to counter these needs has been proposed.

SUMMARY OF THE INVENTION

It is an object of the present invention to provide an improved fuel injection control apparatus for a diesel engine that will always perform an optimal pilot injection regardless of the Cetane number of a fuel and an engine warming-up temperature by feeding back a detection value from an ignition timing sensor, a combustion pressure sensor or a vibration sensor.

According to the fundamental aspect of the present invention, there is provided a method for controlling fuel injection in a diesel engine, including the steps of: detecting an ignition timing of the diesel engine; reading the detected ignition timing data; comparing the read detected ingnition timing data with a reference data and calcualting an ignition timing difference; comparing the ignition timing difference with a predetermined threshold value to decide whether or not the ignition timing difference exceeds the predetermined threshold value; generation a pilot injection timing correction data based on the result of the decision; instructing a pilot injection timing control data based on the generated pilot injection timing correction data; generating a pilot injection timing control drive signal based on the instructed pilot injection timing control data; and driving fuel injection means based on the generated pilot injection timing control drive signal. Thereby a feedback control of a signal based on an output from the ignition timing detection means is used for control of a pilot injection timing to perform ignition at a desired ignition timing.

DESCRIPTION OF THE PREFERRED EMBODIMENTS

Figure 1:
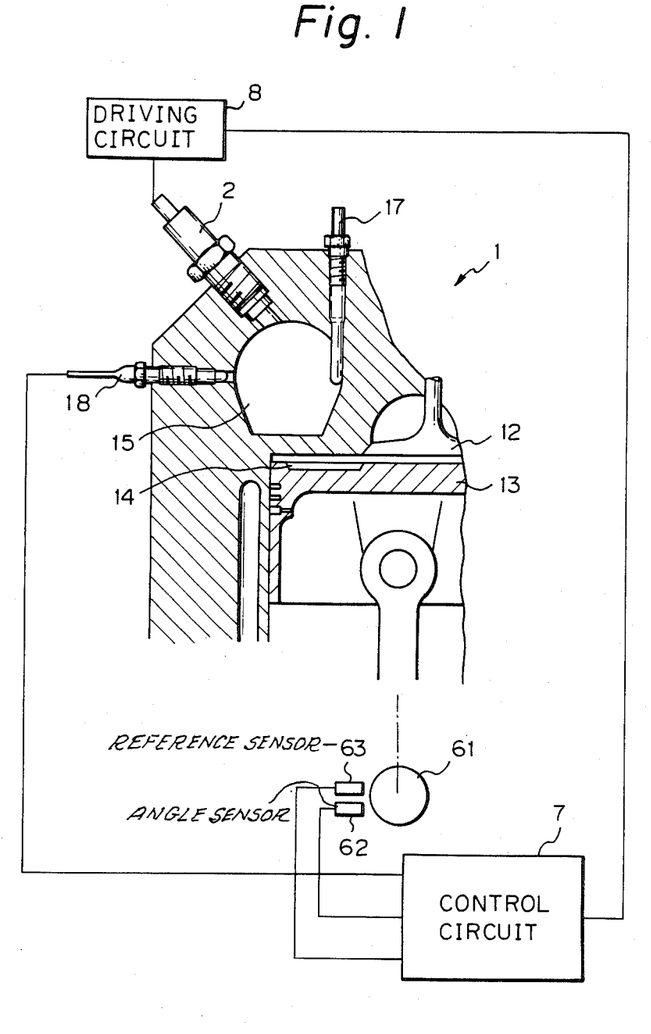
FIG. 1 is a sectional view showing part of a diesel engine fuel injection control apparatus utilizing a pilot injection according to an embodiment of the present invention.

A fuel injection control apparatus for a diesel engine utilizing a pilot injection according to an embodiment of the present invention is illustrated in FIG. 1.

Referring to FIG. 1, an engine 1 includes an intake/exhaust valve 12, and a piston 13. A combustion chamber has a main combustion chamber 14 and a combustion turbulence chamber 15. An injection valve 2 and a glow plug 17 are provided in the turbulence chamber 15. The above construction of the diesel engine is the same as that of a conventional diesel engine.

An ignition timing sensor 18 is provided in the turbulence chamber 15, in the apparatus of FIG. 1. In addition, the structure of the fuel injection valve 2 itself and the fuel injection pump for supplying fuel to the normal injection valve are specific features of the present invention and allow a pilot injection.

Figure 2:
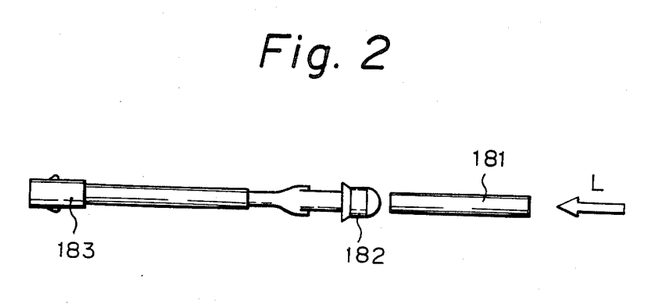
FIG. 2 is a schematic view of an ignition timing sensor in the apparatus in FIG. 1.
Figure 3:
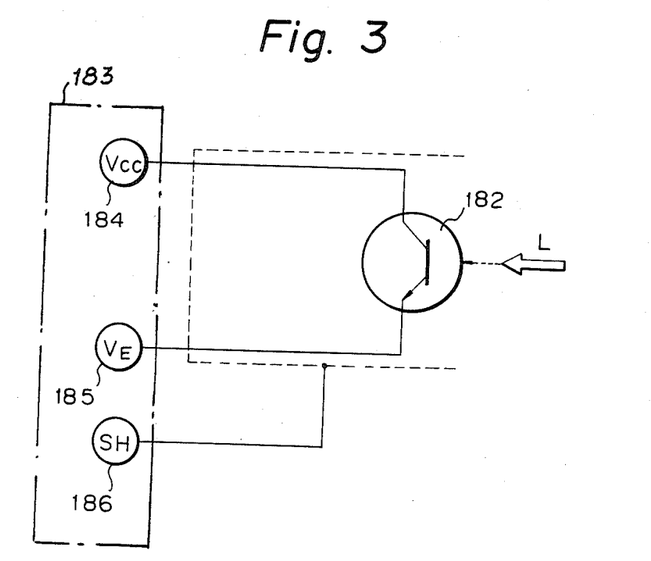
FIG. 3 is an equivalent circuit diagram of the ignition timing sensor in FIG. 2.

The structure of the ignition timing sensor in the control apparatus of FIG. 1 and its equivalent circuit are shown in FIGS. 2 and 3, respectively. The ignition timing sensor 18 is known to those skilled in the art. Combustion light L in the turbulence chamber 15 is incident on a phototransistor 182 through quartz glass 181. An electrical signal from the phototransistor 182 can be supplied to an external electrical circuit through an electrical output connector 183.

In the equivalent circuit in FIG. 3, the connector 183 has a collector (Vcc) terminal 184, an emitter ($V_E$) terminal 185 and a shield (SH) terminal 186. A current between the emitter $V_E$ terminal and shield SH terminal 186 is detected while a DC voltage of about 5 V is applied from an external electrical circuit to the collector Vcc terminal 184. The ignition timing sensor 18 detects an ignition timing when a current with a level higher than a predetermined level is detected.

Figure 4:
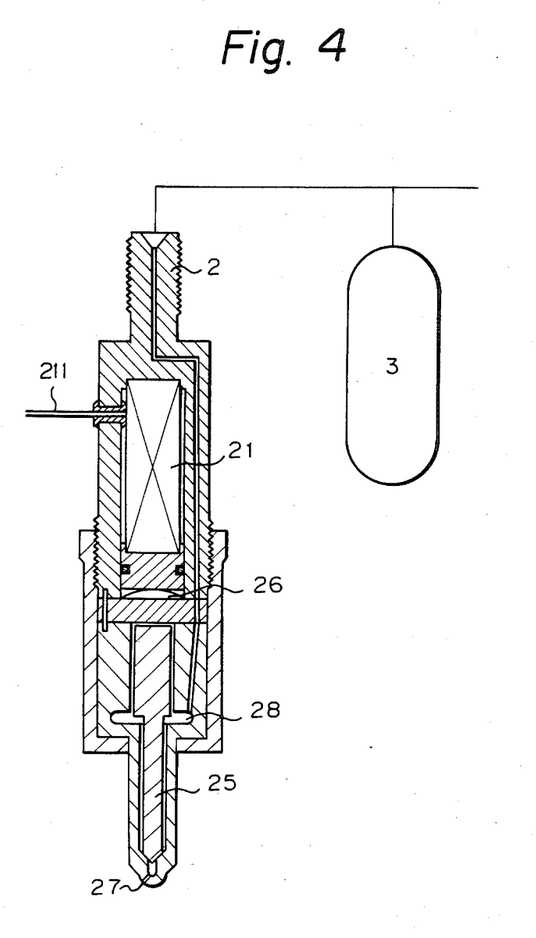
FIG. 4 is a sectional view of an injection valve in the apparatus of FIG. 1.

The arrangement of the fuel injection valve 2 in the control apparatus of FIG. 1 is shown in FIG. 4. A special implementation is provided in the structure of the fuel injection valve 2 to achieve pilot injection. In the fuel injection valve 2, a needle 25 is moved upward or downward by a hydraulic pressure generated by a control hydraulic chamber 26. When a hydraulic pressure of the control hydraulic chamber 26 is high, the needle 25 is moved downward to interrupt communication between an injection port 27 and an oil reservoir 28. However, when a hydraulic pressure in the control hydraulic chamber 26 is low, the needle 25 is moved upward to establish communication between the injection port 27 and the oil reservoir 28, thereby performing fuel injection.

The volume of the control hydraulic chamber 26 is variable according to the length of a piezoelectric element stack (piezostack) 21. When a positive voltage is appleid to the piezostack 21, the piezostack 21 is extended to increase the hydraulic pressure of the control hydraulic chamber 26. However, when a negative voltage is applied to the piezostack 21, the piezostack 21 is constricated to decrease the hydraulic pressure of the control hydraulic chamber 26.

The oil reservoir 28 communicates with an external accumulator 3. Fuel is accumulated in the accumulator 3 and is always compressed by a high-pressure pump at a pressure of 200 kg/cm$^2$. Upon application of a negative voltage to the piezostack 21, compressed fuel at a pressure of 200 kg/cm$^2$ is injected from the injection port 27. However, upon application of a positive voltage to the piezostack 21, fuel injection is stopped.

The fuel injection valve desribed above is described in Japanese Unexamined Patent Publication (Kokai) No. 59-206668 filed by the same application as that of the invention of the present application. This injection valve has a high response speed. Several fuel injections can be performed for each injection stroke. When pilot injection is performed using such an injection valve at an idle speed (700 rpm without load), noise, i.e., idle knock, inherent in a diesel engine can be decreased.

In a pilot injection, auxiliary fuel injection, for example, 1 mm$^3$/st for an injection peiod of 50$\mu$ sec, is performed at a 2°-4° before top dead center (BTDC) prior to main injection, for example, 7 mm$^3$/st for an injection period of 350$\mu$ sec, at a top dead center (TDC). In this manner, main injection is effectively performed as soon as the ignition of auxiliary injection is completed.

Assume that main injection is to be performed at the TDC. The Cetane number of fuel and the engine warming-up state influence which BTDC for auxiliary injection, i.e., pilot injection, provides an ignition timing at the TDC or slightly prior thereto.

Figure 5:
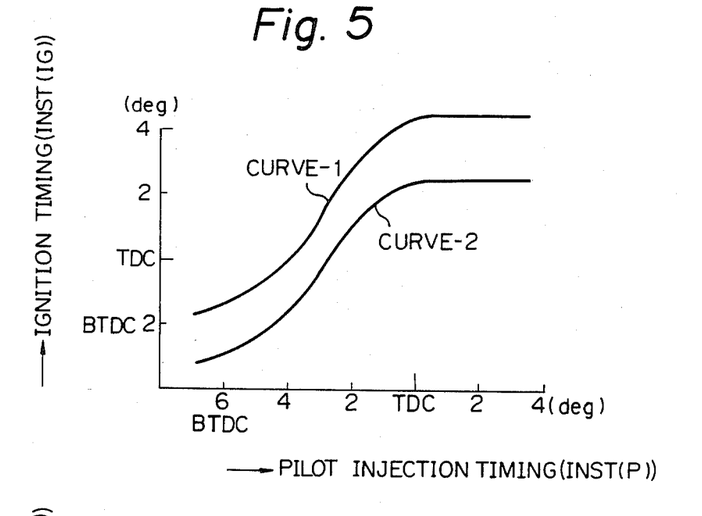
FIGS. 5 and 6 are graphs showing dynamic characteristics of the apparatus in FIG. 1.

FIG. 5 shows the relationship between the injection timing INST (P) of pilot injection and the ignition timing INST (IG) when main injection is fixed at the TDC. In order to start ignition at the TDC, the injection timing INST (P) is given at a 4° BTDC (Curve-1) before warming-up and a 2.5° BTDC (Curve-2) after warming-up.

In the control apparatus shown in FIG. 1, the pilot injection timing is set to cause the ignition timing sensor 18 to detect that the ignition occurs at the TDC, or slightly before the TDC. More specifically, when the ignition timing is retarded with respect to the TDC, the application of a negative voltage to the piezostack 21 is set earlier. However, when the ignition timing is advanced with respect to the TDC, the application of a negative voltage to the piezostack 21 is retarded. When the ignition timing is shifted by a crank angle of 1°, the pilot injection timing must be shifted by 1°. In this manner, feedback control is performed to set the ignition at the TDC once for every two revolutions of the engine.

Figure 7:
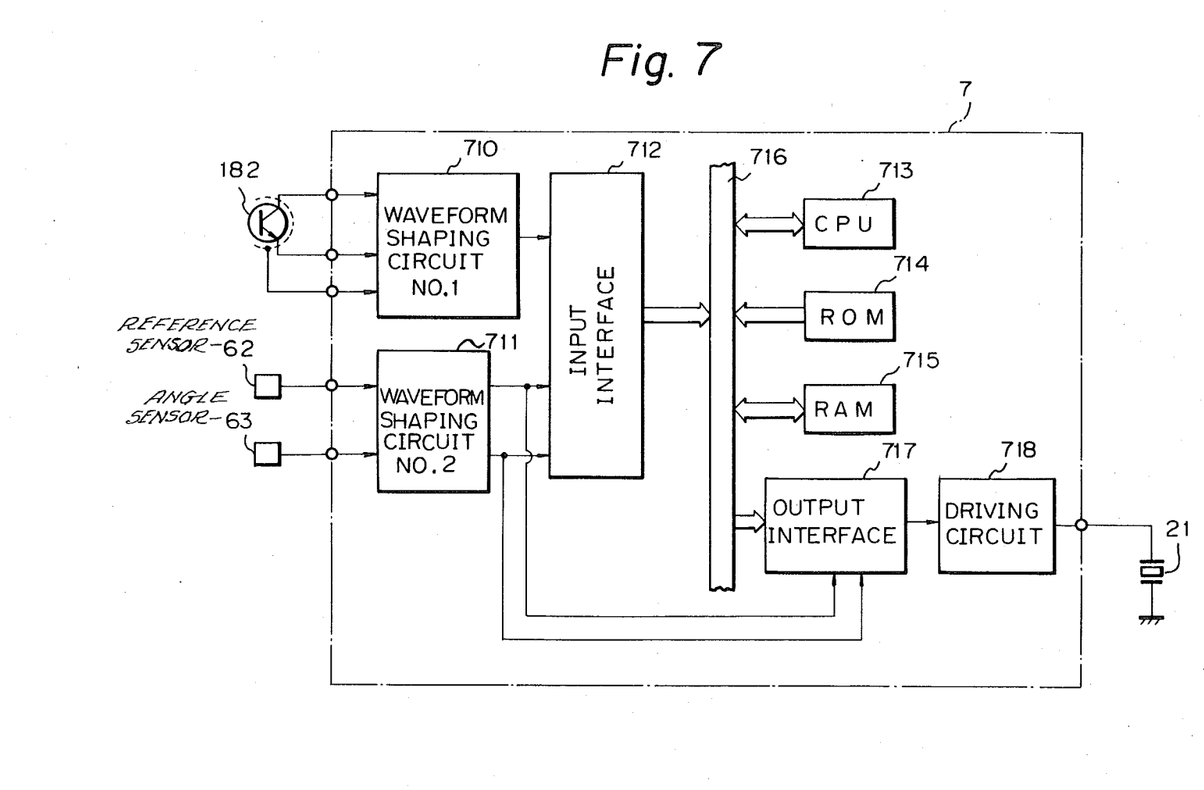
FIG. 7 is a block diagram of a control circuit in the apparatus of FIG. 1.

The arrangement of the control circuit 7 in the control of FIG. 1 is shown in FIG. 7.

Referring to FIG. 7, reference numeral 710 denotes a first wave form shaping circuit for shaping a signal from the photo- transistor 182 built into the ignition sensor 18; and 711, a second wave form shaping circuit for shaping signals from angle and reference sensors 62 and 63 mounted on the cam shaft of the engine.

The angle sensor 62 comprises, for example, a photointerrupter. A singal with 720 pulses per revolution is generated using a disk 61 mounted on the cam shaft and having 720 slits. The signal from the angle sensor 62 is an angle signal for each crank angle of 1° CA. The reference sensor 63 also comprises a photo-interrupter and detects one slit formed in the disk 61. The reference sensor 63 generates a signal at the TDC of, for example, a first cylinder.

The signals from the angle and reference sensors 62 and 63 are connected to an input interface 712. The input interface 712 calculates an ignition timing in accordance with the angle signal and the reference singal. The calculated data is sent as digital values to a bus line 716. Reference numeral 713 denotes a CPU for controlling the pilot injection timing and the main injection quantity in accordance with various data; 714, a ROM for storing various data and programs; 715, a CPU working RAM; and 716, a bus line for exchanging data.

Reference numeral 717 denotes an output interface for receiving the data calculated by the CPU 713 and for generating an injection signal of a predetermined timing by using the angle signal and the reference signal. The injection signal is amplified by a driver 718 to a high voltage of $+500$ to $-200$ V, thereby driving the piezostack 21 in the injection valve 2 and hence intermittently injecting fuel.

Figure 8:
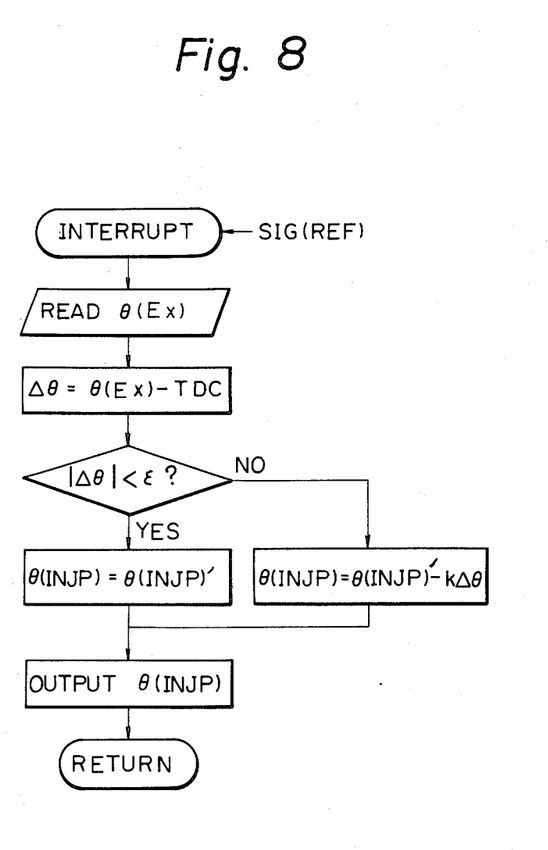
FIG. 8 is a flow chart for explaining the operation of the control circuit in FIG. 7.

The operation of the circuit in FIG. 7 will be described with reference to the flow chart of FIG. 8. An interrupt routine is started in response to a reference signal SIG (REF) generated upon each two engine revolutions. The CPU fetches a pilot injection ignition timing $\theta$ (EX) through the input interface 712. The CPU then calculates a difference between the ignition timing $\theta$ and the TDC. In other words, $\Delta\theta = \theta(EX) - TDC$ is calculated. When the absolute value of $\Delta\theta$ is smaller than a smallest value $\epsilon$, the ignition timing $\theta$ is determined to be optimally controlled. In this case, the next pilot injection timing $\theta$ (INJP) is substituted for the previous value $\theta$ (INJP)'. However when the absolute value of the difference $\Delta\theta$ is larger than $\epsilon$, the CPU determines that the pilot injection timing is not proper and corrects the pilot injection timing in the following manner.

The preceding injection timing $\theta$ (INJP)' is corrected with k $\Delta\theta$ to obtain the next pilot injection timing $\theta$ (INJP), where k is a pedetermined coefficient or 1 or less. In other words, $\theta$ (INJP) = $\theta$(INJP)' $-$ k$\Delta\theta$ is calculated to set the pilot ignition timing at the TDC. The next pilot injection timing $\theta$ (INJP) is latched by the output interface 717 through the bus line. The injection signal is generated at the predetermined timing and drives the piezostack 21.

Figure 9:
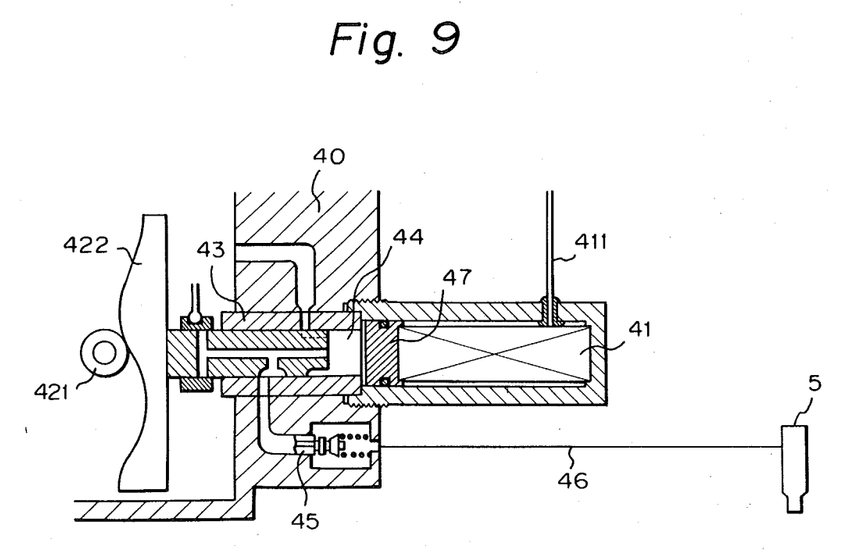
FIG. 9 is a sectional view showing part of a fuel injection system according to another embodiment of the present invention.
Figure 10:
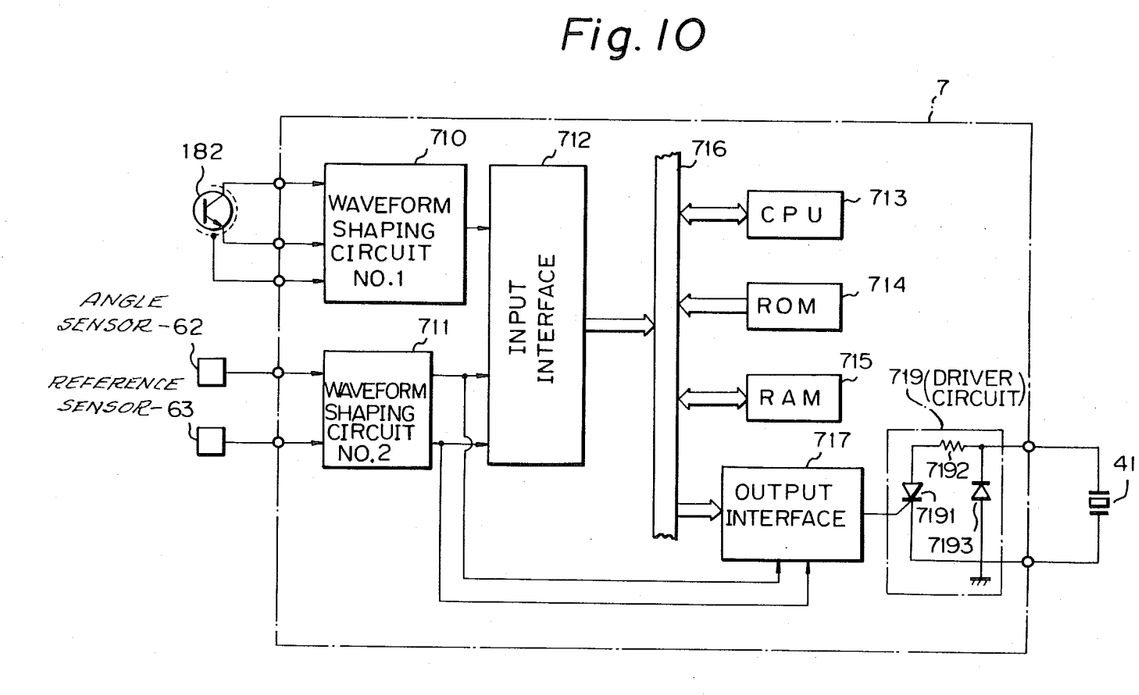
FIG. 10 is a block diagram of a control circuit in the fuel injection system of FIG. 9.

A fuel injection control section and a control circuit therefor according to another ambodiment of the present invention are shown in FIGS. 9 and 10. In the control apparatus in FIG. 9, an injection valve 5 comprises a normal automatic valve. A spring force acts on a needle so as to close the injection valve 5. The needle is then automatically lifted in synchronization with oil supply operation of the injection pump to cause an oil reservoir to communicate with an injection port. The structure of the injection pump for compressing and supplying fuel to the injection valve 5 is specially implemented to achieve pilot injection.

The injection pump 40 has a basic structure known as a Bosch VE type injection pump. A face cam 422 engaged with a roller 421 is rotated in synchronism with the engine to reciprocate a plunger 43, thereby performing the delivery and intake strokes of a pump chamber 44. Fuel is delivered from the pump chamber 44 to the injection valve 5 through a delivery valve 45 and an injection steel pipe 46. Although the above description concerns the operation of a VE type injection pump, a pilot injection cannot be performed with a conventional VE type injection pump.

In order to perform pilot injection, a piston 47 is arranged at a position opposite to that of a plunger 43 of the pump chamber 44 and is driven by a piezostack 41.

The piezostack 41 is extended in the intake stroke of the pump chamber 44 and is then constricted during the delivery stroke. When the piezostack 41 is constricted, the volume of the pump chamber 44 is abruptly increased and the delivery stroke is temporarily interrupted. A pilot injection is performed prior to the interruption of the delivery stroke, and main injection is then performed thereafter.

In order to constrict the piezostack 41, the piezostack 41 charged by the fuel pressure in the pump chamber 44 in the preceding delivery stroke is discharged through a lead wire 411. The structure, function and control technique as described above are described in a Japanese patent application No. 59-147788 filed by Nippon Soken Co. on July 16, 1984. According to this control technique, however, the pilot injection start timing cannot be arbitrarily controlled. Only the discharge control timing INST (CONT) of the piezostack 41 can be controlled.

In order to most effectively decrease the diesel knock, the discharge control timing INST(CONT) is set to select the earliest ignition timing INST(IG). However, the ignition timing varies according to the Cetane number of fuel and the engine warming-up state, as previously described.

Figure 6:
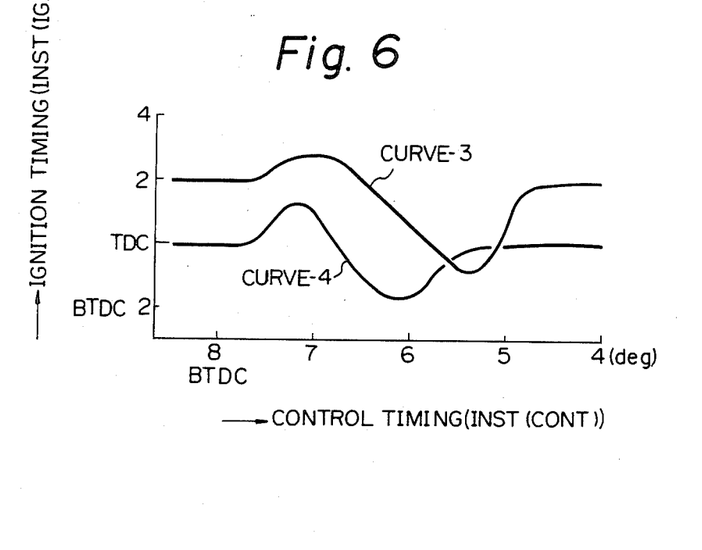

The relationship between the control timing INST-(CONT) and the ignition timing INST(IG) is shown in FIG. 6. When the delivery stroke of the injection pump 40 is started at an 8° BTDC, and actual injection is started at about 4° BTDC due to influences of the length of the injection steel pipe 46 and a duration required for opening the injection valve 6. Therefore, the ignition timing corresponds to about TDC. The control timing for providing the earliest ignition timing is a 5.3° BTDC before warming-up (Curve-3) and a 6.2° BTDC after warming-up (Curve-4), and cannot be solely determined. In this embodiment, the control timing is given as the earliest timing for causing the ignition timing sensor 18 to detect an ignition.

In the range of a 5° BTDC to a 7° BTDC, if the control timing is advanced by a crank angle of, for example, 0.1° and the ignition timing is advanced by 0.02°, the control timing is advanced by 0.1° again. In this case, if the ignition timing is retarded by 0.02° or more, the control timing is then retarded by 0.1°. This operation is repeated for each two revolutions of the engine. When a change in ignition timing falls within the range of 0.02° even if the control timing is changed by 0.1°, the next control timing is fixed as the current control timing.

The arrangement of a control circuit 7 for the fuel injection control described above is shown in FIG. 10. A thyristor 7191 is connected to a high-voltage side of the piezostack 41 through a current limiting resistor 7192. The cathode of a diode 7193 is connected to the high-voltage side of the piezostack 41, and the anode thereof is grounded. The diode 7193 prevents application of a reverse voltage to the piezostack 41 and supplies a charge to extend the piezostack 41. The thyristor 7191 is turned on in response to a predetermined trigger signal from an output interface 717, so that the piezostack 41 is discharged through the resistor 7192. In this case, the voltage at the piezostack 41 is lowered and constrict. As previously described, the injection is temporarily interrupted to cause pilot injection.

Figures 11, 11A:
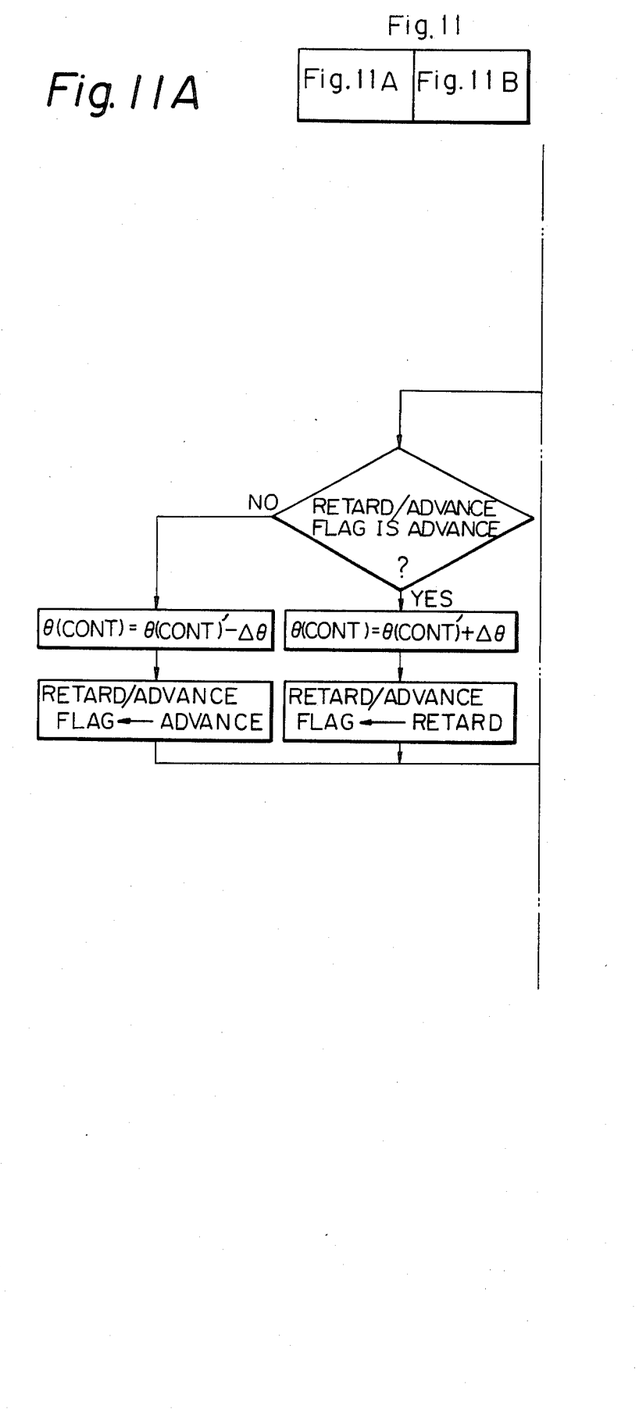
FIGS. 11, 11A, and 11B are flow charts for explaining the operation of the control circuit in FIG. 10.
Figure 11B:
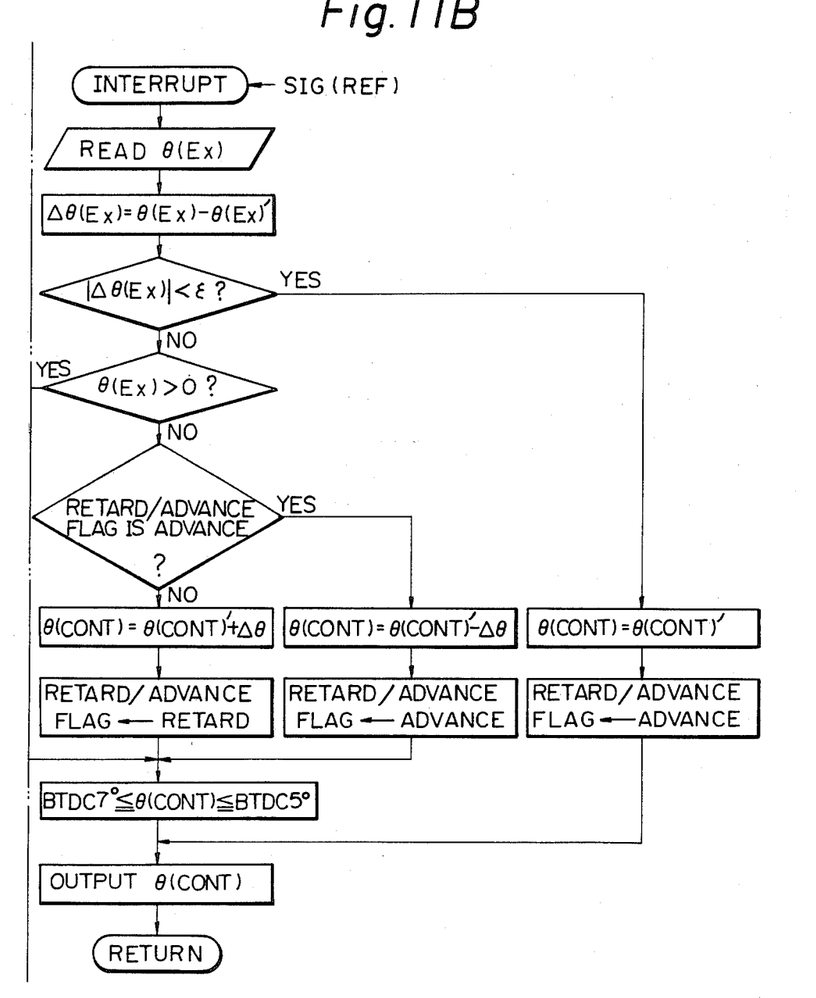

The operation of the control circuit in FIG. 10 will be described with reference to the flow chart of FIG. 11. The interrupt routine is started in response to a reference signal SIG(REF). The CPU reads the pilot injection ignition timing $\theta(EX)$ from the input interface 712. The CPU then calculates a difference between $\theta(EX)$ and the preceding ignition timing $\theta(EX)'$ such that $\Delta\theta(EX) = \theta(EX) - \theta(EX)'$.

When the absolute value of the difference $\Delta\theta(EX)$ is smaller than a smallest value $\epsilon$, for example, 0.02°, the CPU determines that $\theta(EX)$ is controlled at the minimum value. The preceding value $\theta(CONT)'$ is used as the next control timing $\theta(CONT)$. However, when the absolute value of $\Delta\theta(EX)$ is larger than $\epsilon$, the CPU determines that the pilot control timing $\theta(CONT)$ is not proper, and correction is then performed.

A decision whether $\Delta\theta(EX)$ is positive or negative is made. If $\Delta\theta(EX)$ is decided to be positive, the current ignition timing proves to be retarded from the preceding ignition timing. Hence, correction should be made to advance the next pilot control timing from the preceding pilot control timing. Therefore, the decision whether retard or advance took place in the preceding control timing must be made. For this purpose, a retard-/advance flag is provided. If the preceding pilot control timing leads the immediately preceding timing, the current control timing should be retarded. However, if the preceding pilot control timing is retarded, the current pilot control timing should be advanced from the preceding pilot control timing. The timing retard/advance is given in units of $\Delta\theta$, for example, 0.1° CA.

When $\Delta\theta(EX)$ is negative, the current ignition timing leads the preceding ignition timing. In order to shorten the timing cycle, control is made in the same direction as the preceding control timing. More specifically, if the preceding control timing is advanced from the immediately preceding control timing, the current control timing should be advanced from the previous control timing. However, if the precedig control timing is retarded from the immediately preceding control timing, the current control timing should be retarded from the preceding control timing. In order to cause the current control timing to be advanced from the preceding control timing, the next pilot injection control timing $\theta(CONT)$ is obtained by substracting $\Delta\theta$ from the preceding value $\theta(CONT)$, and the retard/advance flag is set in the lead mode.

In order to retard the timing, $\theta(CONT) = \theta(CONT)' + \Delta\theta$ is calculated, and the retard/advance flag is set in the lag mode. Subsequently, the limiter operation is performed to caus $\theta(CONT)$ to fall within the range of 7° BTDC to 5° BTDC, and $\theta(CONT)$ is output to the output interface 717.

A trigger signal is supplied to the thyristor 7191 at a predetermined timing, and the thyristor 7191 is turned on to discharge the piezostack 41, thereby performing pilot injection control. Therefore, the pilot injection ignition timing $\theta(EX)$ can be always controlled to be the minimum value, i.e., the earliest timing. The noise reduction effect is thus maximized.

Various modifications may be made to practice the present invention. For example, when a multiple cylinder engine is used, ignition timing sensors 8 are preferably arranged in the respective cylinders to control pilot control of each cylinder. However, an ignition timing sensor can be arranged in one cylinder, and other cylinders can be controlled under the same conditions as in the cylinder with the ignition timing sensor. This control technique is regarded to be more practical.

In the above embodiments, only the pilot injection start timing is controlled. Instead, the start timing can lead the preceding start timing and at the same time be prolonged. In other words, the pilot start time can be prolonged. This technique is more effective than the technique described above.

In the control apparatus of FIG. 9, the piezostack 41 is charged in accordance with an internal pressure of the pump chamber 44, and a maximum of about 500 V is generated. This voltage corresponds to the crank angle and may be used to control the pilot timing. When the control timing reaches a level corresponding to 10 V or more, corresponding to when the timing in terms of the crank angle is retarded, and the ignition timing is advanced by 0.02° or more, the control timing is set at a level corresponding to the voltage of 10 V or more.

In the circuit of FIG. 10, even if the pilot control timing is selected to obtain the earliest ignition timing, and the resultant ignition timing is unsatisfactory, the ignition timing can be varied by a known timer mechanism or the like. This technique effectively controls the ignition timing.

In the above embodiments, the ignition timing sensor includes an arrangement for detecting combustion light. However, other means such as a technique for detecting a pressure in the combustion chamber and an abrupt rise of pressure as an ignition timing, a technique for detecting a temperature of the combustion chamber and an abrupt rise of temperature as an ignition timing, and a technique for detecting an output torque of the engine and an abrupt rise of output torque as an ignition timing may be utilized.

We claim:

1. A method for controlling a pilot fuel injection in a diesel engine, comprising the steps of:
   detecting an ignition timing of said diesel engine, using a light sensing means responsive to light produced by a combustion of a pilot injection fuel;
   comparing the detected ignition timing with a reference value and calculating an ignition timing difference;
   comparing said ignition timing difference with a predetermined threshold value to determine whether or not the ignition timing difference exceeds the predetermined threshold value;
   generating a pilot injection timing correction data based on the result of the determination in said comparing said difference step;
   instructing a pilot injection timing control data based on the generated pilot injection timing correction data;
   generating a pilot injection timing control drive signal based on the instructed pilot injection timing control data; and
   driving a fuel injection means based on the generated pilot injection timing control drive signal,
   whereby a feedback control of a pilot injection timing is performed in response to the detected ignition timing to cause ignition of said pilot ignition fuel at a desired ignition timing.

2. An apparatus for controlling a pilot fuel injection in a diesel engine, comprising:
   light sensing means providing on said diesel engine and responsive to a light produced upon combustion of a pilot injection fuel;
   ignition timing detection means for detecting an ignition timing of the diesel engine based on light sensed by said light sensing means;
   calculation means for calculating an ignition timing difference based on a comparison between the detected ignition timing and a reference value;
   ignition timing difference decision means for comparing a predetermined threshold value with the ignition timing difference and determining whether the ignition timing difference exceeds the predetermined threshold value;
   pilot injection timing correction means for generating pilot injection timing correction data based on an output from said ignition timing decision means;
   pilot injection timing control instruction means for receiving the pilot injection timing correction data from said pilot injection timing correction means and generating a pilot injection timing control data;
   pilot injection timing control driving means for receiving the pilot injection timing control instruction from said pilot injection timing control instructing means; and
   fuel injection means driven by said pilot injection timing control driving means;
   whereby a feedback control of a signal based on an output from said ignition timing detection means is used for control of a pilot injection timing to perform ignition at a desired ignition timing.

3. An apparatus for controlling fuel injection in a diesel engine, comprising:
   ignition timing detection means for detecting an ignition timing of the diesel engine;
   ignition timing data reading means for reading said ignition timing from said ignition timing detection means;
   ignition timing difference calculation means for comparing a reference value with said timing read by said ignition timing data reading means and calculating an ignition timing difference;
   ignition timing difference decision means for comparing a predetermined threshold value with said ignition timing difference and determining whether or not the ignition timing difference exceeds the predetermined threshold value;
   pilot injection timing correction means for generating pilot injection timing correction data in based on the decision output from said ignition timing error decision means;
   pilot injection timing control instruction means for receiving the pilot injection timing correction data from said pilot injection timing correction means and generating a pilot injection timing control data;
   pilot injection timing control driving means for receiving the pilot injection timing control instruction from said pilot injection timing control instruction means; and
   fuel injection means, driven by said pilot injection timing control driving means, said fuel injection means for always receiving high-pressure fuel and for opening in response to the pilot injection timing control instruction to perform injection, whereby a feedback control of a signal based on an output from said ignition timing detection means is used for control of a pilot injection timing to perform ignition at a desired ignition timing.

4. An apparatus for controlling fuel injection in a engine, comprising:
ignition timing detection means for detecting an ignition timing of the diesel engine;
ignition timing data reading means for reading said ignition timing from said ignition timing detection means;
ignition timing difference calculation means for comparing a reference value with said timing read by said ignition timing data reading means and calculating an ignition timing difference;
ignition timing difference decision means for comparing a predetermined threshold value with said ignition timing difference and determining whether or not the ignition timing difference exceeds the predetermined threshold value;
pilot injection timing correction means for generating pilot injection timing correction data in based on the decision output from said ignition timing error decision means;
pilot injection timing control instruction means for receiving the pilot injection timing correction data from said pilot injection timing correction means and generating a pilot injection timing control data;
pilot injection timing control driving means for receiving the pilot injection timing control instruction from said pilot injection timing control instruction means; and
fuel injection means driven by said pilot injection timing control driving means;
a plunger;
an injection pump;
piston means, for varying a volume of a pump chamber of said injection pump independently of said plunger, said piston means being movable in response to the pilot injection timing control instruction.

5. A method according to claim 1, wherein the reference ignition timing data is a top dead center of the engine.

6. A method according to claim 1, wherein the reference ignition timing reference data is a preceding ignition timing.

7. An apparatus according to claim 2, wherein said fuel injection means comprises a piezoelectric element which is extended/constricted to cause fuel injection.

8. A method as in claim 1 wherein said generating a pilot step occurs only when said ignition timing difference exceeds said threshold value.

9. An apparatus as in claim 2 wherein said pilot injection timing correction means generates said pilot injection timing correction data only if said ignition timing difference is greater than said threshold.

* * * * *

UNITED STATES PATENT AND TRADEMARK OFFICE
CERTIFICATE OF CORRECTION

PATENT NO. : 4,722,310

DATED : February 2, 1988

INVENTOR(S) : Toshihiko Igashira, et al.

It is certified that error appears in the above-identified patent and that said Letters Patent is hereby corrected as shown below:

IN THE HEADING

[30]  Foreign Application Priority Data should read

Apr. 2, 1985 [JP]  Japan....................60-68520

IN THE CLAIMS

Claim 4, line 1, after "a" insert -- diesel --.

Signed and Sealed this

Sixth Day of September, 1988

Attest:

DONALD J. QUIGG

Attesting Officer

Commissioner of Patents and Trademarks